(12) United States Patent
Odillard

(10) Patent No.: US 11,035,325 B2
(45) Date of Patent: Jun. 15, 2021

(54) SYSTEM AND METHOD MAKING IT POSSIBLE TO DEACTIVATE AT LEAST ONE CYLINDER OF AN ENGINE, INTAKE MANIFOLD AND HEAT EXCHANGER INCLUDING SAID SYSTEM

(71) Applicant: Valeo Systemes Thermiques, Le Mesnil Saint Denis (FR)

(72) Inventor: Laurent Odillard, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 432 days.

(21) Appl. No.: 15/780,021

(22) PCT Filed: Nov. 30, 2016

(86) PCT No.: PCT/EP2016/079319
§ 371 (c)(1),
(2) Date: Nov. 13, 2018

(87) PCT Pub. No.: WO2017/093341
PCT Pub. Date: Jun. 8, 2017

(65) Prior Publication Data
US 2019/0063378 A1 Feb. 28, 2019

(30) Foreign Application Priority Data

Nov. 30, 2015 (FR) ........................................ 1561571

(51) Int. Cl.
*F02M 26/64* (2016.01)
*F02D 9/14* (2006.01)
(Continued)

(52) U.S. Cl.
CPC ........... *F02M 26/64* (2016.02); *F02B 29/045* (2013.01); *F02D 9/14* (2013.01); *F02D 17/02* (2013.01);
(Continued)

(58) Field of Classification Search
CPC .. F02M 26/64; F02M 35/10255; F02M 26/21; F02M 26/66; F02M 26/70;
(Continued)

(56) References Cited

U.S. PATENT DOCUMENTS 4,198,940 A * 4/1980 Ishida ..................... F02D 17/02
123/198 F
4,201,180 A * 5/1980 Lizuka .................... F02D 17/02
123/481

(Continued)

FOREIGN PATENT DOCUMENTS

DE 30 44 382 A1 9/1981
DE 10 2013 210597 A1 12/2013
(Continued)

OTHER PUBLICATIONS

International Search Report issued in PCT/EP2016/079319 dated Dec. 23, 2016 (3 pages).
(Continued)

*Primary Examiner* — Hung Q Nguyen
(74) *Attorney, Agent, or Firm* — Osha Bergman Watanabe & Burton LLP

(57) ABSTRACT

A system for deactivating at least one predetermined cylinder of an operational multicylinder engine, with each cylinder including an intake duct with an inlet connected to the intake manifold and an outlet connected to the cylinder in order to allow the intake of combustion gases from the intake manifold to the cylinder, may include a first movable sealing means suitable for sealing the inlet of said intake
(Continued)

duct of the predetermined cylinder, a recirculation duct suitable for connecting said intake duct of said predetermined cylinder to an exhaust gas supply, and a second movable sealing means suitable for sealing said recirculation duct.

7 Claims, 2 Drawing Sheets

(51) Int. Cl.
| | | |
|---|---|---|
| *F02D 17/02* | (2006.01) | |
| *F02M 26/21* | (2016.01) | |
| *F02M 26/66* | (2016.01) | |
| *F02B 29/04* | (2006.01) | |
| *F02D 21/08* | (2006.01) | |
| *F02M 35/10* | (2006.01) | |
| *F02M 26/70* | (2016.01) | |
| *F02D 41/00* | (2006.01) | |

(52) U.S. Cl.
CPC ............ *F02D 21/08* (2013.01); *F02M 26/21* (2016.02); *F02M 26/66* (2016.02); *F02M 35/10255* (2013.01); *F02D 41/0087* (2013.01); *F02M 26/70* (2016.02)

(58) Field of Classification Search
CPC .......... F02B 29/045; F02D 21/08; F02D 9/14; F02D 17/02; F02D 41/0087
See application file for complete search history.

(56) References Cited

U.S. PATENT DOCUMENTS

| | | | | |
|---|---|---|---|---|
| 4,304,208 A | * | 12/1981 | Etoh | ........................ F02D 17/02 123/198 F |
| 4,313,406 A | * | 2/1982 | Iizuka | ..................... F02D 17/02 123/198 F |
| 4,320,726 A | | 3/1982 | Etoh et al. | |
| 4,337,740 A | * | 7/1982 | Sugasawa | ................ F02D 17/02 123/198 F |
| 4,344,393 A | * | 8/1982 | Etoh | ........................ F02D 17/02 123/198 F |
| 4,345,571 A | * | 8/1982 | Iizuka | ..................... F02D 17/02 123/198 F |
| 5,213,087 A | * | 5/1993 | Sausner | ................... F02D 21/08 123/400 |
| 5,562,085 A | * | 10/1996 | Kosuda | .................... F02D 17/02 123/198 F |
| 6,053,154 A | * | 4/2000 | Pott | ......................... F02M 26/24 123/568.11 |
| 8,122,873 B2 | * | 2/2012 | Furukawa | ............... F02M 26/26 123/568.24 |
| 8,261,725 B2 | * | 9/2012 | Furukawa | ............... F02M 26/64 123/568.19 |
| 9,856,806 B2 | * | 1/2018 | Bjurman | ............. F02D 41/0055 |
| 2003/0116146 A1 | * | 6/2003 | Fensom | .................. F02M 26/54 123/568.21 |
| 2005/0028796 A1 | * | 2/2005 | Tussing | ................... F02M 26/25 123/568.22 |
| 2006/0283430 A1 | * | 12/2006 | Atkinson | ................ F02M 26/64 123/568.19 |
| 2011/0113775 A1 | * | 5/2011 | Lilly | ...................... F02B 37/013 60/605.2 |
| 2016/0146136 A1 | * | 5/2016 | Surnilla | ............... F02D 41/0087 123/568.21 |

FOREIGN PATENT DOCUMENTS

| | | |
|---|---|---|
| JP | 2015-110948 A | 6/2015 |
| WO | 2015/010903 A1 | 1/2015 |

OTHER PUBLICATIONS

Written Opinion of the International Searching Authority issued in PCT/EP2016/079319 dated Dec. 23, 2016 (5 pages).

* cited by examiner

SYSTEM AND METHOD MAKING IT POSSIBLE TO DEACTIVATE AT LEAST ONE CYLINDER OF AN ENGINE, INTAKE MANIFOLD AND HEAT EXCHANGER INCLUDING SAID SYSTEM

FIELD OF DISCLOSURE

The present invention concerns the field of motor vehicles, and more precisely a device making it possible to deactivate at least one cylinder of a multicylinder engine of an operational motor vehicle.

BACKGROUND

Today, within a motor vehicle, it is known to use a multicylinder engine in which one or more cylinders may be deactivated during operation of the multicylinder engine. Normally, an engine operates on several cylinders following a four-stroke cycle which comprises: an intake stage, a compression stage, a combustion stage and an expansion or exhaust stage. The efficiency of the four-stroke cycle is optimal when the losses due to transfer of the gases during the intake and exhaust phases, known as pumping losses, are minimal.

In order to limit these losses, the prior art discloses solutions which make it possible to deactivate one or more cylinders during operation of the motor vehicle engine at low load. More generally, the option allowing deactivation of one or more cylinders may be considered when the loaded engine power can be generated by just some of the cylinders available in the engine of the motor vehicle.

In the prior art, several solutions are known which make it possible to deactivate one or more cylinders of the multicylinder engine of a motor vehicle. According to a solution known from the prior art, the valves of the cylinders to be deactivated are fixed in a closed position in order to prevent the inlet and expulsion of said gases inside said cylinders, which operate as pneumatic springs. Thus it is possible to deactivate one or more cylinders of the multicylinder engine of a motor vehicle. The power required for the multicylinder engine is generated by the activated cylinders when the valves of the deactivated cylinders are closed. The force necessary for compression of the gases inside the deactivated cylinders is equivalent to the power supplied during the expansion stage of the gases present inside said deactivated cylinders.

One of the drawbacks of the systems known from the prior art lies in the fact that during part of the cycle, the pressure of the gas inside the deactivated cylinders is lower than the pressure prevailing in the intake manifold. The presence of the pressure difference causes an aspiration of fluid, such as oil, towards the inside of the deactivated cylinders. Since the consequences of this aspiration are harmful for the multicylinder engine, cylinders are only deactivated for a limited duration.

Another major disadvantage of the systems known from the prior art is that during the period of deactivation of one or more cylinders of the multicylinder engine of a motor vehicle, the temperature prevailing inside the deactivated cylinders may fall below the temperature required for optimal function of the catalytic converter. The consequences of this temperature drop are also harmful for optimal operation of the multicylinder engine.

Consequently, it has proved necessary to improve the solutions described above from the prior art, in particular concerning the deactivation of one or more cylinders of a multicylinder engine for a motor vehicle, in order to optimize the operation of said multicylinder engine.

SUMMARY OF DISCLOSURE

The present invention aims to improve at least one of the problems described above.

A first object of the invention concerns a system for deactivating at least one predetermined cylinder of an operational multicylinder engine, wherein each cylinder of said multicylinder engine comprises an intake duct with an inlet connected to the intake manifold and an outlet connected to the cylinder in order to allow the intake of combustion gases from the intake manifold to the cylinder, the system comprising a first movable sealing means suitable for sealing the inlet of said intake duct of the predetermined cylinder, the first sealing means being movable between a first position allowing the intake of combustion gases towards said intake duct and a second position for blocking the intake of combustion gases towards said intake duct, a recirculation duct suitable for connecting said intake duct of said predetermined cylinder to an exhaust gas supply, a second movable sealing means suitable for sealing said recirculation duct, the second sealing means being movable between a first position for blocking the communication between said recirculation duct and the exhaust gas supply, and a second position for allowing this communication.

According to one embodiment of the invention, the first movable sealing means and the second movable sealing means are connected in order to move simultaneously.

According to one embodiment of the invention, the first movable sealing means is connected to a rotation shaft provided with a gearing system, and the second movable sealing means is provided with a rack, said rack being in contact with said gearing system to allow the first movable sealing means to move between its first position and its second position by rotation, and allow the second movable sealing means to move simultaneously by translation between its first position and its second position.

According to one embodiment of the invention, the recirculation duct is connected to the intake duct of said predetermined cylinder with a connection positioned between the inlet and outlet of said intake duct.

According to one embodiment of the invention, the first movable sealing means comprises a flap.

According to one embodiment of the invention, the second movable sealing means comprises a valve.

A second object of the invention concerns an intake manifold for a multicylinder engine comprising outlets for connecting the intake manifold to the inlets of the intake ducts of the cylinders of the multicylinder engine, wherein at least one outlet of said intake manifold comprises the system according to the invention.

A third object of the invention concerns a heat exchanger suitable for use inside an intake manifold for a multicylinder engine, said heat exchanger comprising outlets for connecting the heat exchanger to the inlets of the intake ducts of the cylinders of said multicylinder engine, wherein at least one outlet of the heat exchanger comprises the system according to the invention.

A fourth object of the invention concerns a method for deactivating at least one predetermined cylinder of an operational multicylinder engine, wherein each cylinder of said multicylinder engine comprises an intake duct with an inlet connected to the intake manifold and an outlet connected to the cylinder in order to allow the intake of combustion gases from the intake manifold to the cylinder, wherein the inlet of the intake duct of at least said predetermined cylinder comprises a first sealing means, said sealing means being movable between a first position for allowing the intake of combustion gases towards said intake duct and a second position for blocking the intake of combustion gases towards said intake duct, and wherein the intake duct of at least said predetermined cylinder is connected to the exhaust manifold by means of a recirculation duct comprising a second movable sealing means, the second movable sealing means being movable between a first position for blocking the communication between said recirculation duct and said intake duct of said predetermined cylinder and a second position for allowing this communication, the method comprising the following steps:

monitoring the power of the loaded multicylinder engine by means of a monitoring system, comparing the power of the loaded multicylinder engine with a predefined threshold value, establishing that the power of the loaded multicylinder engine lies below the predefined threshold, triggering the movement of the first sealing means towards its second position for blocking the intake of combustion gases to the intake duct of the predetermined cylinder, triggering the movement of the second movable closing means from its first position to its second position in order thus to allow the intake of exhaust gases towards the intake duct of the predetermined cylinder.

BRIEF DESCRIPTION OF DRAWINGS

The aims, objects and characteristics of the present invention and its advantages will appear more clearly from reading the description below of preferred embodiments for the supply of air to a multicylinder engine according to the invention, given with reference to the attached drawings in which.

DETAILED DESCRIPTION

In the present description, the terms "supply air" or "charge air" refers to the air coming from the intake system of the engine. These terms may also refer to a mixture of air and exhaust gas recirculated from the engine using the exhaust gas recirculation system, generally known under the acronym EGR, in which the exhaust gases originate from a combustion process between the fuel of the motor vehicle and the supply air.

Figure 1:
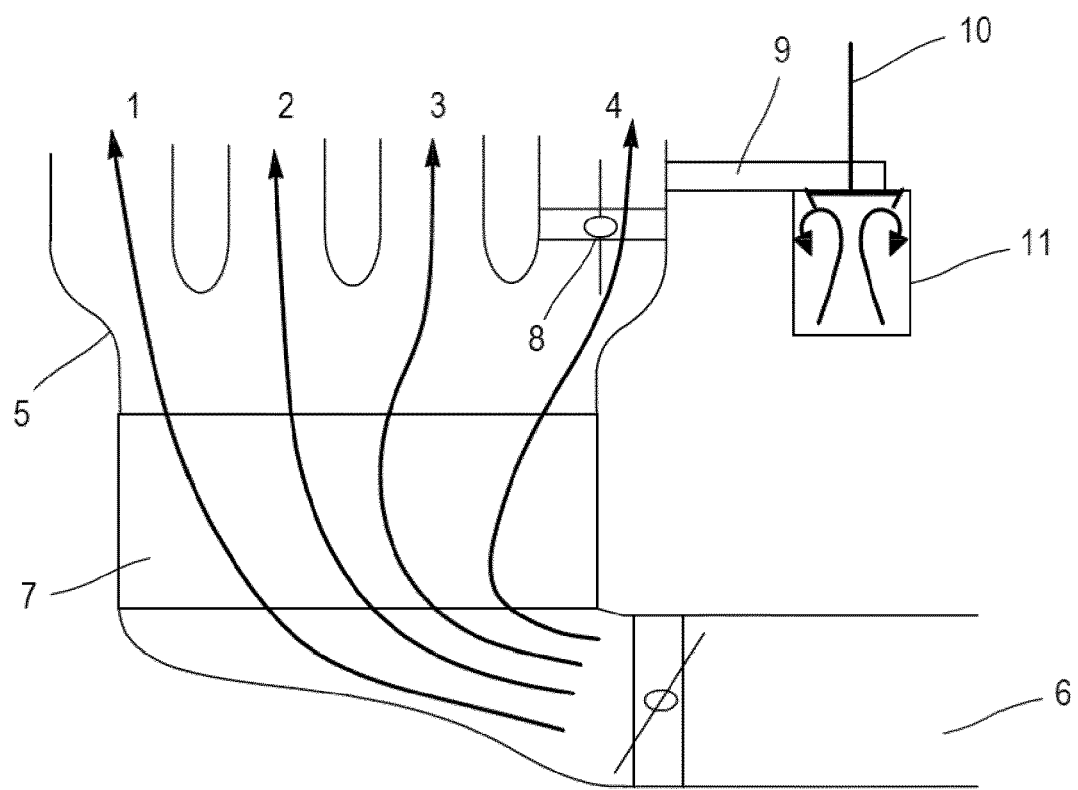
FIG. 1 shows diagrammatically the operation of a system making it possible to deactivate at least one cylinder of a multicylinder engine of a motor vehicle according to the present invention.

FIG. 1 shows diagrammatically a system for deactivating one or more cylinders of a multicylinder engine of a motor vehicle.

FIG. 1 indicates diagrammatically an engine provided with four cylinders referenced 1, 2, 3, 4, connected to an intake manifold 5. The function of the intake manifold 5 is to guide the intake gases from an inlet 6 towards the cylinders 1, 2, 3, 4. The intake manifold 5 may comprise a heat exchanger 7 which allows a reduction in the temperature of the intake gases before they enter the cylinders 1, 2, 3, 4. As FIG. 1 shows, cylinder 4 is provided with a first sealing means in the form of a flap 8 suitable for moving from a first open position to a second closed position. The flap 8 prevents the intake of gases towards cylinder 4 during the deactivation of said cylinder 4. A duct 9 allows the inlet of the cylinder 4 to be connected to a device (not shown) comprising a second sealing means in the form of a valve 10. The valve 10 may move from a first closed position to a second open position in order to allow the intake gases to pass via the duct 9 towards the cylinder 4 (when the valve is in the open position). Furthermore, the valve 10 communicates with a chamber 11 which is connected to a supply of recirculation gases such as an EGR system (not shown) allowing the recirculation of exhaust gases. Thus the chamber 11 receives a specific quantity of exhaust gases subject to a specific pressure.

The function of the system as shown on FIG. 1 is as follows: during operation of the multicylinder engine of the motor vehicle provided with four activated cylinders 1, 2, 3, 4, a monitoring system (not shown) determines whether the pressure required for normal operation of the multicylinder engine may be generated by three activated cylinders instead of four activated cylinders. When the monitoring system validates operation of the multicylinder engine by activation of only three cylinders, the monitoring system commands the triggering of two functions allowing performance of two actions simultaneously. Thus the first function concerns the flap 8 which moves from a first position, shown on FIG. 1, to a second position for blocking the inlet of cylinder 4. The second function concerns a valve 10 which moves simultaneously with the flap in order to allow the exhaust gases to access the cylinder 4 via the duct 9. Thus when the flap 8 is closed, the intake gases can no longer enter the deactivated cylinder 4. The intake gases may still enter the cylinders 1, 2, 3 which remain activated. The deactivated cylinder 4 retains the same function as that of the activated cylinders 1, 2, 3.

During a normal cycle, the intake gases are first aspirated and then compressed before undergoing a phase of expansion and exhaust. In cylinder 4, when the flap 8 is closed and the valve 10 open, the ignition stage may be stopped if necessary. The ignition stage inside the cylinder 4 produces no combustion or explosion because of the absence of combustion gas. If ignition is maintained, no combustion or explosion results from the presence of ignition inside the cylinder 4 due to the absence of fuel.

The technical effect resulting from the solution shown on FIG. 1 is that the pressure inside cylinder 4 is never, at any moment of the cycle, lower than the pressure prevailing inside the intake manifold 5. Thus no aspiration of fluid such as oil towards the interior of the cylinder 4 occurs. Furthermore, the closure of cylinder 4 leads to an increase in load in said activated cylinders 1, 2, 3. Thus the temperature rises in cylinders 1, 2, 3. Simultaneously, the hot recirculated exhaust gases flow inside the duct 9. Consequently, the combination of the rise in temperature of the combusted gases in the activated cylinders 1, 2, 3, and the flow of hot recirculated exhaust gas, allows the engine temperature to be maintained above the optimal operating temperature of the catalytic converter or the light-off temperature.

The operating principle as described with reference to FIG. 1 may be applied to any type of air supply intended for motor vehicles, more particularly motor vehicles comprising a multicylinder engine with controlled ignition, i.e. a petrol engine, or compression ignition, i.e. a diesel engine. The use of the principle of deactivating at least one cylinder may be applied to a "charged" or to a "normally aspirated" engine.

The solution according to the present invention may also be integrated in a turbocharged engine. In order to increase the density of the intake air of such an engine (not shown), it is known to cool the charge air from the compressor by means of a heat exchanger, such as the heat exchanger 7 shown in FIG. 1, also called a charge air cooler (RAS). The aim of cooling the charge air is to improve combustion inside the cylinders. In certain applications, the heat exchanger 7 has the feature of integrating the function of the intake manifold of the internal combustion engine. In this situation, the heat exchanger 7 is then fixed directly to the cylinder head.

Figure 2:
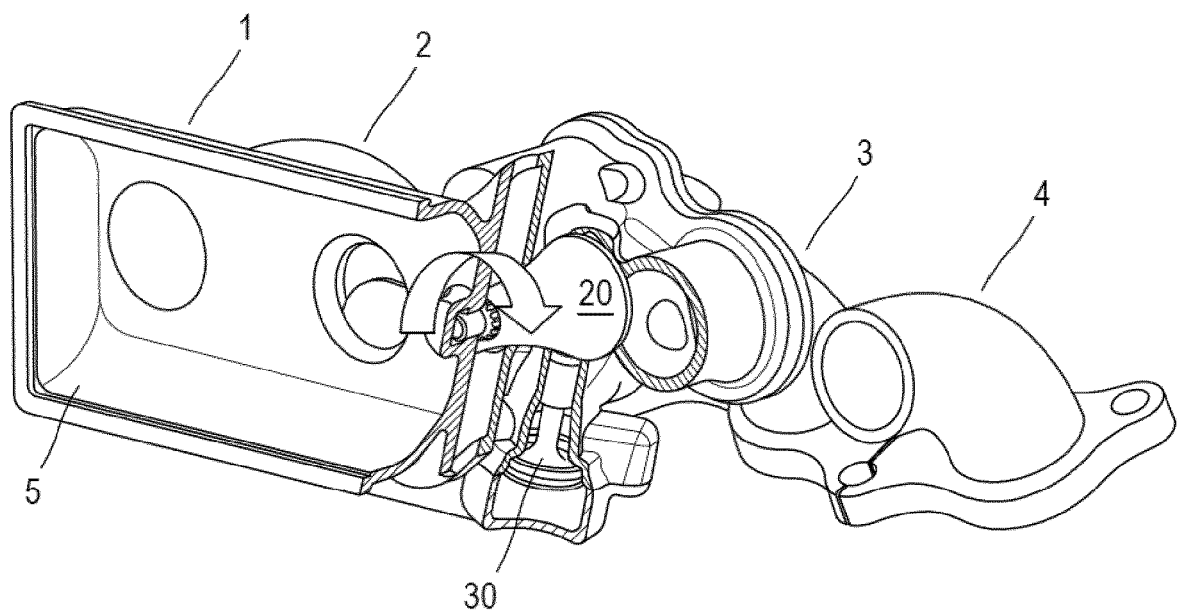
FIG. 2 shows a first embodiment of the system according to the invention comprising a flap and a valve suitable for blocking two cylinders of a four-cylinder engine within a motor vehicle, when the deactivation stage of said cylinders begins.

FIG. 2 shows a first embodiment of the assembly comprising a flap 20 and a valve 30. FIG. 2 also shows part of the outlet of the intake manifold 5 and the intake ducts allowing the air to penetrate and circulate towards the cylinders 1, 2, 3, 4. According to the embodiment shown on FIG. 2, the flap 20 is positioned centrally between the intake ducts towards the cylinders 2, 3. FIG. 2 shows the flap 20 moving from a first position to a second position following the direction of the arrow. In the first position, the flap 20 does not block any intake duct.

Figure 3:
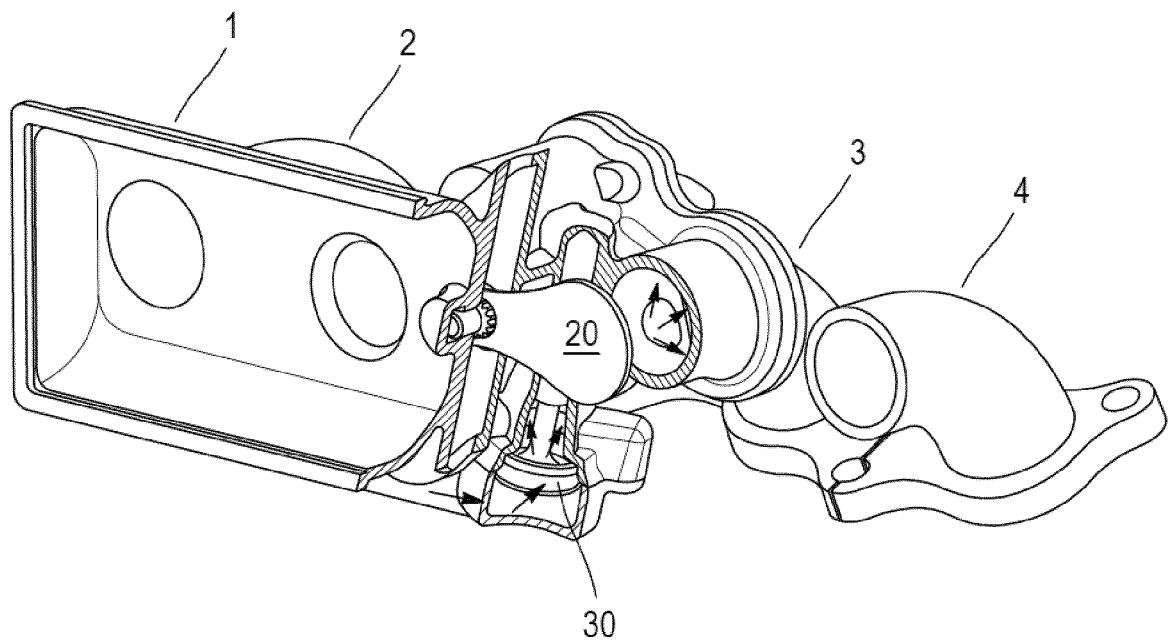
FIG. 3 shows the system comprising a flap and a valve when the step of deactivation of two cylinders is terminated.

FIG. 3 shows a second position of the flap 20, said position being suitable for blocking the intake ducts of cylinders 2, 3. Simultaneously, the valve 30 moves from a first closed position to a second open position in order to allow exhaust gases to circulate through said valve 30 towards the intake ducts of cylinders 2, 3.

The examples shown on FIGS. 2 and 3 depict deactivated cylinders comprising a single flap 20. The solution shown on FIGS. 2, 3 allows deactivation of two cylinders using simple low-cost parts. The deactivation of two adjacent cylinders guarantees the stability of the multicylinder engine.

Figure 4:
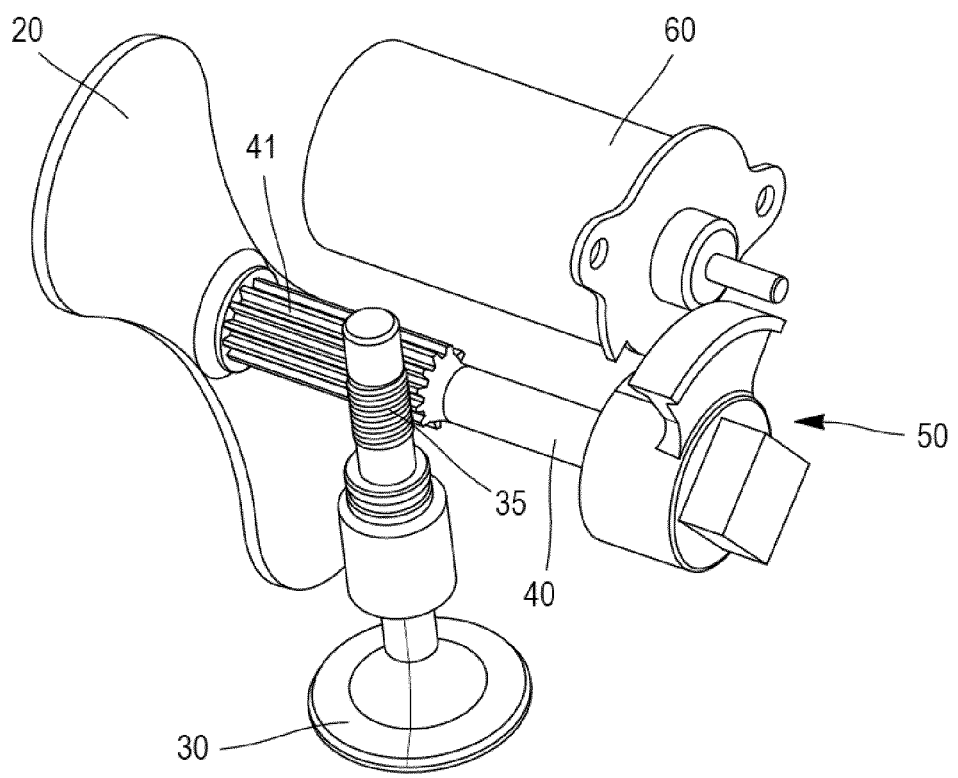
FIG. 4 shows a detail view of the system comprising a flap and a valve, and the connection of this system to an electric motor.

FIG. 4 shows in detail the assembly comprising the flap 20 and the valve 30. The flap 20 is mounted on the end of a rotation shaft 40 provided with a gearing system 41. The valve 30 is positioned so as to come into contact with the gearing system 41 on the rotation shaft 40 by means of a rack 35. The second end of the rotation shaft 40 comprises a crown wheel 50 equipped with a return spring. The crown wheel 50 is in contact with a motor 60 used to move the assembly comprising the flap 20 and the valve 30. In practice, the motor 60 is controlled by a monitoring device (not shown). The monitoring device determines whether one or more cylinders of the multicylinder engine of the motor vehicle concerned should be deactivated or reactivated. A command is then generated to activate the motor. Since the motor is in contact with the crown wheel 50, said crown wheel 50 moves from a first position to a second position. The movement of the crown wheel 50 causes a rotation of the shaft 40. The flap 20, directly fixed to the rotation shaft 40, moves with the rotation shaft 40. Thanks to the combination of the gearing system 41 on the rotation shaft 40 and the rack 35 of the valve 30, said valve 30 moves simultaneously with the rotation of the flap 20.

In practice, the movement of the flap 20 and the valve 30 from a first deactivated position for allowing use of all cylinders, to a second closed position as shown in FIG. 3, has a duration of one or several milliseconds. Preferably, the duration of the movement of the flap 20 in combination with the valve 30 coincides with the duration of a double revolution of the crankshaft (not shown) of the motor vehicle.

According to a particular embodiment, the invention concerns an intake manifold in which the system for deactivating at least one cylinder according to the invention is integrated.

According to an alternative embodiment of the invention, the system for deactivating at least one cylinder is integrated in a heat exchanger.

What is claimed:

1. A system for deactivating at least one predetermined cylinder of an operational multicylinder engine, wherein each cylinder of said multicylinder engine comprises an intake duct with an inlet connected to an intake manifold and an outlet connected to the cylinder to allow the intake of combustion gases from the intake manifold to the cylinder, the system comprising:
    a first movable sealing means for sealing the inlet of the intake duct of the predetermined cylinder, the first sealing means being movable between a first position for allowing the intake of combustion gases towards said intake duct and a second position for blocking the intake of combustion gases towards said intake duct;
    a recirculation duct for connecting said intake duct of said predetermined cylinder to an exhaust gas supply; and
    a second movable sealing means for sealing said recirculation duct, the second sealing means being movable between a first position for blocking the communication between said recirculation duct and the exhaust gas supply, and a second position for allowing this communication;
    wherein the first movable sealing means is connected to a rotation shaft provided with a gearing system, and
    wherein the second movable sealing means is provided with a rack, said rack being in direct contact with said gearing system to allow the first movable sealing means to move between its first position and its second position by rotation, and allow the second movable sealing means to move simultaneously by translation between its first position and its second position.

2. The system as claimed in claim 1, wherein the recirculation duct is connected to the intake duct of said predetermined cylinder with a connection positioned between the inlet and outlet of said intake duct.

3. The system as claimed in claim 1, wherein the first movable sealing means comprises a flap.

4. The system as claimed in claim 1, wherein the second movable sealing means comprises a valve.

5. An intake manifold for a multicylinder engine comprising:
    outlets for connecting the intake manifold to one or more inlets of one or more intake ducts of one or more cylinders of the multicylinder engine,
    wherein at least one outlet of said intake manifold comprises the system as claimed in claim 1.

6. A heat exchanger for use inside an intake manifold for a multicylinder engine, said heat exchanger comprising:
    outlets for connecting the heat exchanger to one or more inlets of one or more intake ducts of one or more cylinders of said multicylinder engine,
    wherein at least one outlet of the heat exchanger comprises the system as claimed in claim 1.

7. A method for deactivating at least one predetermined cylinder of an operational multicylinder engine, wherein each cylinder of said multicylinder engine comprises an intake duct with an inlet connected to an intake manifold and an outlet connected to the cylinder to allow the intake of combustion gases from the intake manifold to the cylinder, wherein the inlet of the intake duct of at least said predetermined cylinder comprises a first sealing means, said sealing means being movable between a first position for allowing the intake of combustion gases towards the intake duct and a second position for blocking the intake of combustion gases towards the intake duct, and wherein the intake duct of at least said predetermined cylinder is connected to an exhaust manifold by means of a recirculation duct comprising a second movable sealing means, the second movable sealing means being movable between a first position for blocking the communication between said recirculation duct and said intake duct of said predetermined cylinder and a second position for allowing this communication, the first movable sealing means being connected to a rotation shaft provided with a gearing system, and the second movable sealing means being provided with a rack, said rack being in direct contact with said gearing system to allow the first movable sealing means to move between its first position and its second position by rotation, and allow the second movable sealing means to move simultaneously by translation between its first position and its second position, the method comprising:

monitoring a power of the loaded multicylinder engine by means of a monitoring system;

comparing the power of the loaded multicylinder engine with a predefined threshold value;

establishing that the power of the loaded multicylinder engine lies below the predefined threshold;

triggering the movement of the first sealing means towards the second position for blocking the intake of combustion gases to the intake duct of the predetermined cylinder; and triggering the movement of the second movable closing means from the first position to the second position to allow the intake of exhaust gases towards the intake duct of the predetermined cylinder.

* * * * *